(12) United States Patent
Sathyamoorthy et al.

(10) Patent No.: US 12,072,785 B2
(45) Date of Patent: Aug. 27, 2024

(54) FUNCTIONAL IMPACT IDENTIFICATION FOR SOFTWARE INSTRUMENTATION

(71) Applicant: SAP SE, Walldorf (DE)

(72) Inventors: Krishnamoorthy Sathyamoorthy, Krishnagiri (IN); Mirko Beccaria, Vimercate (IT); Siddartha Shah, Dublin, CA (US); Sriharsha Venkata Teegavarapu, Bangalore (IN); Gaurav Rathi, Bangalore (IN); Naveenkumar Jayam Pandurangaiah, Bangalore (IN)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 17/503,709

(22) Filed: Oct. 18, 2021

(65) Prior Publication Data

US 2023/0122397 A1  Apr. 20, 2023

(51) Int. Cl.
*G06F 8/65* (2018.01)
*G06F 9/451* (2018.01)
*G06F 11/36* (2006.01)

(52) U.S. Cl.
CPC ......... *G06F 11/3644* (2013.01); *G06F 8/65* (2013.01); *G06F 9/451* (2018.02); *G06F 11/3612* (2013.01)

(58) Field of Classification Search
CPC ........ G06F 8/65; G06F 9/451; G06F 11/3612; G06F 11/3644

USPC .......................................................... 717/130
See application file for complete search history.

(56) References Cited

U.S. PATENT DOCUMENTS

| | | | |
|---|---|---|---|
| 2005/0289531 A1* | 12/2005 | Illowsky et al. | G06F 8/658 717/163 |
| 2019/0266070 A1* | 8/2019 | Bhandarkar et al. | G06F 11/3644 |
| 2023/0086361 A1* | 3/2023 | Wan et al. | G06F 8/65 702/186 |

* cited by examiner

*Primary Examiner* — Wei Y Zhen
*Assistant Examiner* — Mohammed N Huda
(74) *Attorney, Agent, or Firm* — Mintz Levin Cohn Ferris Glovsky and Popeo, P.C.

(57) ABSTRACT

A method for instrumenting an update to a software application may include determining, based on a source code file affected by the update to the software application, a first method affected by the update to the software application. A second method called by the first method and a third method called by the second method may also be identified as being affected by the update to the software application. A user interface file that includes a call to the first method, the second method, and/or the third method may be identified. The functional impact of the update may be determined by identifying one or more functional flows that match the user interface file. A recommendation identifying the one or more matching functional flows as candidates for testing may be generated. Related systems and computer program products are also provided.

20 Claims, 15 Drawing Sheets

FUNCTIONAL IMPACT IDENTIFICATION FOR SOFTWARE INSTRUMENTATION

TECHNICAL FIELD

The subject matter described herein relates generally to software development and more specifically to techniques for identifying functional impact for targeted software instrumentation.

BACKGROUND

The operations of many organizations may rely on a suite enterprise software applications including, for example, enterprise resource planning (ERP) software, customer relationship management (CRM) software, and/or the like. These enterprise software applications may provide a variety of functionalities including, for example, billing, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely from multiple clients (e.g., a web browser and/or the like). In cases where an organization relies on legacy enterprise software applications, some of which may date back many decades, frequent updates may be necessary to keep the legacy enterprise software applications compatible with current infrastructure and functionally available.

SUMMARY

Systems, methods, and articles of manufacture, including computer program products, are provided for software instrumentation. In one aspect, there is provided a system. The system may include at least one data processor and at least one memory. The at least one memory may store instructions that cause operations when executed by the at least one data processor. The operations may include: determining, based at least on a source code file affected by an update to a software application, a first method affected by the update to the software application; identifying a second method called by the first method affected by the update to the software application; identifying a first user interface file that includes a first call to the first method and/or the second method; determining that a first functional flow of the software application matches the first user interface file; and generating a recommendation identifying the first functional flow for testing.

In some variations, one or more features disclosed herein including the following features can optionally be included in any feasible combination. The first functional flow may be determined to match the first user interface file based at least on a first name of the first functional flow and a second name of the first user interface file.

In some variations, the operations may further include: generating, for each of one or more words included in the second name of the first user interface file, a corresponding word vector; generating a first mean vector corresponding to a mean of one or more vectors representative of the one or more words included in the second name of the first user interface file; calculating a similarity metric between the first mean vector and a second mean vector associated with the first name of the first functional flow; and determining, based at least on the similarity metric satisfying a threshold, that the first functional flow matches the first user interface file.

In some variations, the recommendation may be generated to include the first functional flow based at least on a confidence score of the match between the first functional flow and the first user interface file satisfying a threshold.

In some variations, the operations may further include: identifying, based at least on a commit identifier and/or a pull request number of the update to the software application, the source code file affected by the update to the software application.

In some variations, the operations may further include: determining that the update to the software application includes modifying the source code file; and in response to the update to the software application modifying the source code file, determining that the first method is affected by the update but not a third method based at least on the modifying of the source code file changing the first method but not the third method.

In some variations, the operations may further include: determining that the update to the software application includes adding the source code file; and in response to the update to the software application adding the source code file, determining that the modifying of the source code file modifies the first method and a third method based at least on the source code file including the first method and the third method.

In some variations, the operations may further include: identifying a third method called by the second method; identifying a second user interface file as including a second call to the third method; and determining that the first functional flow and/or a second functional flow of the software application match the second user interface file.

In some variations, the operations may further include: identifying a second user interface file that includes call to the first user interface file; determining that a second functional flow of the software application matches the second user interface file; and generating the recommendation to further identify the second functional flow for testing.

In some variations, the operations may further include: updating, based at least on a user feedback associated with the recommendation, a confidence score associated with the match between the first functional flow and the first user interface file.

In some variations, the confidence score may correspond to a first quantity of user feedback indicating that the first functional flow matches the first user interface file and/or a second quantity of user feedback indicating that the first functional flow does not match the first user interface file.

In some variations, the first method and the second method may each include a block of programming code of the software application that is executed by invoking a corresponding name.

In some variations, the first user interface file may include programming code implementing a user interface through which the first functional flow of the software application is invoked.

In some variations, the first method affected by the update to the software application may be determined in response to a user request received via a user interface.

In some variations, the first method affected by the update to the software application may be determined in response to a request to commit the source code file to a programming code repository.

In some variations, the testing may include a regression testing of the first functional flow.

In another aspect, there is provided a method for software instrumentation. The method may include: determining, based at least on a source code file affected by an update to a software application, a first method affected by the update to the software application; identifying a second method called by the first method affected by the update to the software application; identifying a first user interface file that includes a first call to the first method and/or the second method; determining, based at least on a first name of a first functional flow and a second name of the first user interface file, that the first functional flow of the software application matches the first user interface file; and generating a recommendation identifying the first functional flow for testing.

In some variations, one or more features disclosed herein including the following features can optionally be included in any feasible combination. The method may further include: generating, for each of one or more words included in the second name of the first user interface file, a corresponding word vector; generating a first mean vector corresponding to a mean of one or more vectors representative of the one or more words included in the second name of the first user interface file; calculating a similarity metric between the first mean vector and a second mean vector associated with the first name of the first functional flow; and determining, based at least on the similarity metric satisfying a threshold, that the first functional flow matches the first user interface file.

In some variations, the method may further include: identifying a second user interface file that includes call to the first user interface file; determining that a second functional flow of the software application matches the second user interface file; and generating the recommendation to further identify the second functional flow for testing.

In another aspect, there is provided a computer program product that includes a non-transitory computer readable storage medium. The non-transitory computer-readable storage medium may include program code that causes operations when executed by at least one data processor. The operations may include: determining, based at least on a source code file affected by an update to a software application, a first method affected by the update to the software application; identifying a second method called by the first method affected by the update to the software application; identifying a user interface file that includes a call to the first method and/or the second method; determining, based at least on a first name of a functional flow and a second name of the user interface file, that the functional flow of the software application matches the user interface file; and generating a recommendation identifying the functional flow for testing.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to software instrumentation, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
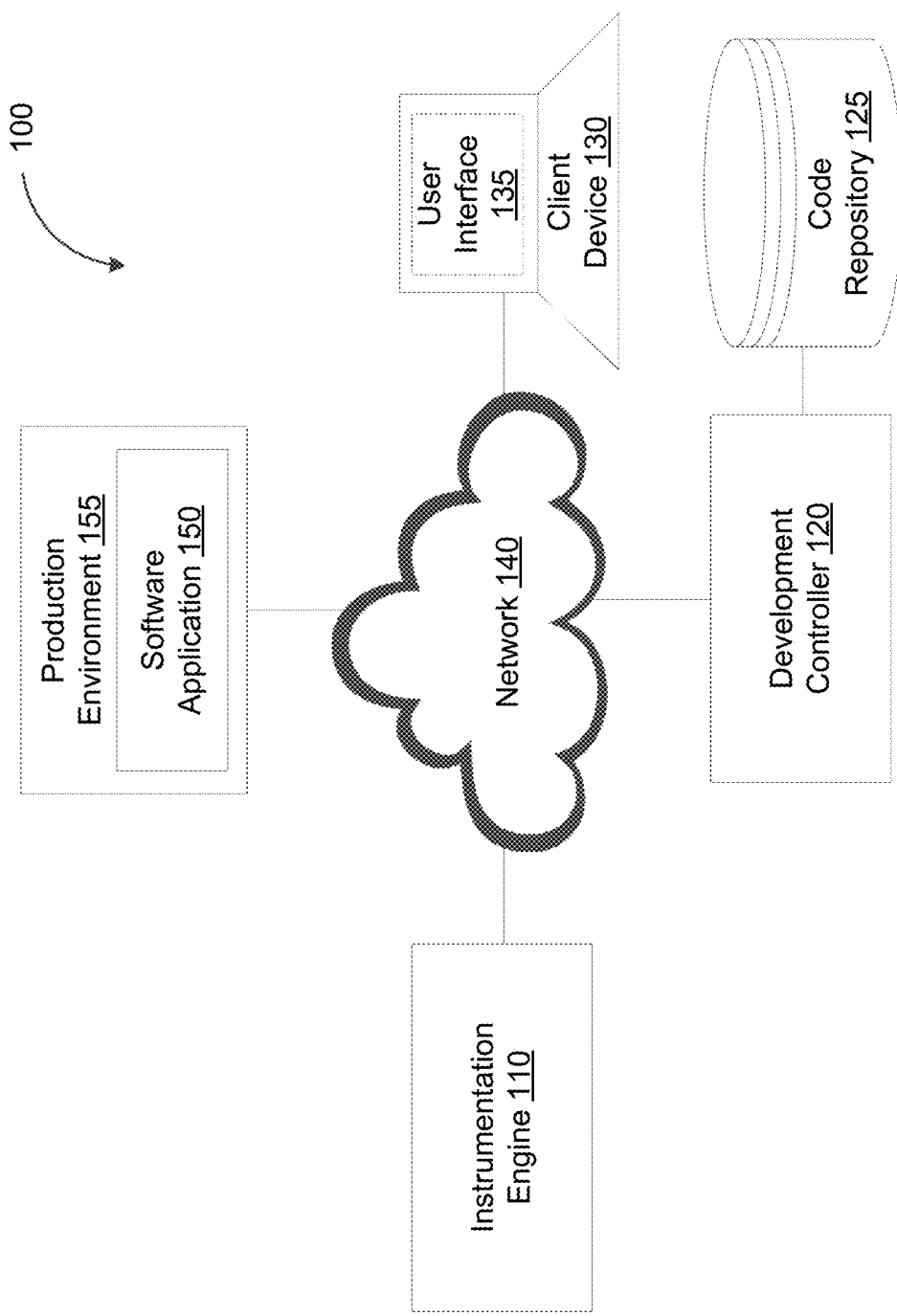
FIG. 1A depicts a system diagram illustrating an example of an instrumentation system, in accordance with some example embodiments.

The development lifecycle of a software application and/or updates to the software application may include a sequence of stages including, for example, development, testing, acceptance, production, and/or the like. For example, the software application may be developed on a development system before undergoing testing in a test environment that closely mimics the production environment for the software application. The software application may subsequently be released to an acceptance test environment for testing by an end user. If the end user accepts the product, then the product may be deployed into the production environment where the software application is made available for use.

In the case of a legacy software application, such as an enterprise software application dating back many decades, frequent updates may be made to the software application in order to repair defects and introduce new features. Such efforts may be necessary to keep the legacy software application compatible with the current production environment and functionally available. However, even minor updates to the software application that affect very few lines of programming code may trigger significant and often unpredictable changes to the functionality of the software application, not all of which are undesirable to the end user. As such, in some example embodiments, an instrumentation engine may be configured to identify the functional impact of an update to a software application. For example, the instrumentation engine may be configured to identify one or more functional flows of the software application that may be impacted by the changes to the programming code implementing the software application.

For an update to the software application that includes a change to the programming code of the software application, the instrumentation engine may identify one or more methods affected by the change. As used herein, the term "method" may refer to a block of programming code (e.g., statements, expressions, and/or the like) that is executed by invoking a name assigned to the block of programming code. The instrumentation engine may further identify one or more user interface files called by the methods affected by the change to the programming code of the software application. Each user interface file may include programming code that implements the user interface through which one or more functional flows of the software application are invoked.

To identify the functional flows impacted by the change to the programming code of the software application, the instrumentation engine may identify a nexus between the names of the user interface files and the names of various functional flows. For example, the instrumentation engine may identify, based at least on a nexus between the respective names, the functional flows for "delete clause" and "edit clause" as being impacted by a change to the programming code of the software application that affects a method calling the "delete clause" user interface file. The instrumentation engine may generate a recommendation including the functional flows impacted by the change to the programming code of the software application. For instance, the functional flows impacted by the change to the programming code of the software application may be recommended for regression testing including, for example, web testing, application programming interface (API) testing, desktop testing, and/or the like. The recommendation, which is limited to the functional flows impacted by the change to the programming code of the software application, may limit the scope of regression testing and expedite the overall testing process. As such, updates to the software application, which may be frequent in the case of the legacy software applications, may be ready for deployment in less time and with minimal impact to the functional availability of the software application.

FIG. 1A depicts a system diagram illustrating an example of an instrumentation system 100, in accordance with some example embodiments. Referring to FIG. 1A, the instrumentation system 100 may include an instrumentation engine 110, a development controller 120 coupled with a code repository 125, and a client device 130. As shown in FIG. 1A, the instrumentation engine 110, the development controller 120, and the client device 130 may be communicatively coupled via a network 140. The client device 130 may be a processor-based device including, for example, a smartphone, a tablet computer, a wearable apparatus, a virtual assistant, an Internet-of-Things (IoT) appliance, and/or the like. The network 140 may be any wired and/or wireless network including, for example, a public land mobile network (PLMN), a wide area network (WAN), a local area network (LAN), a virtual local area network (VLAN), the Internet, and/or the like. Class diagrams of the various components of the instrumentation engine 110 are depicted in FIGS. 5A-J.

Figure 1B:
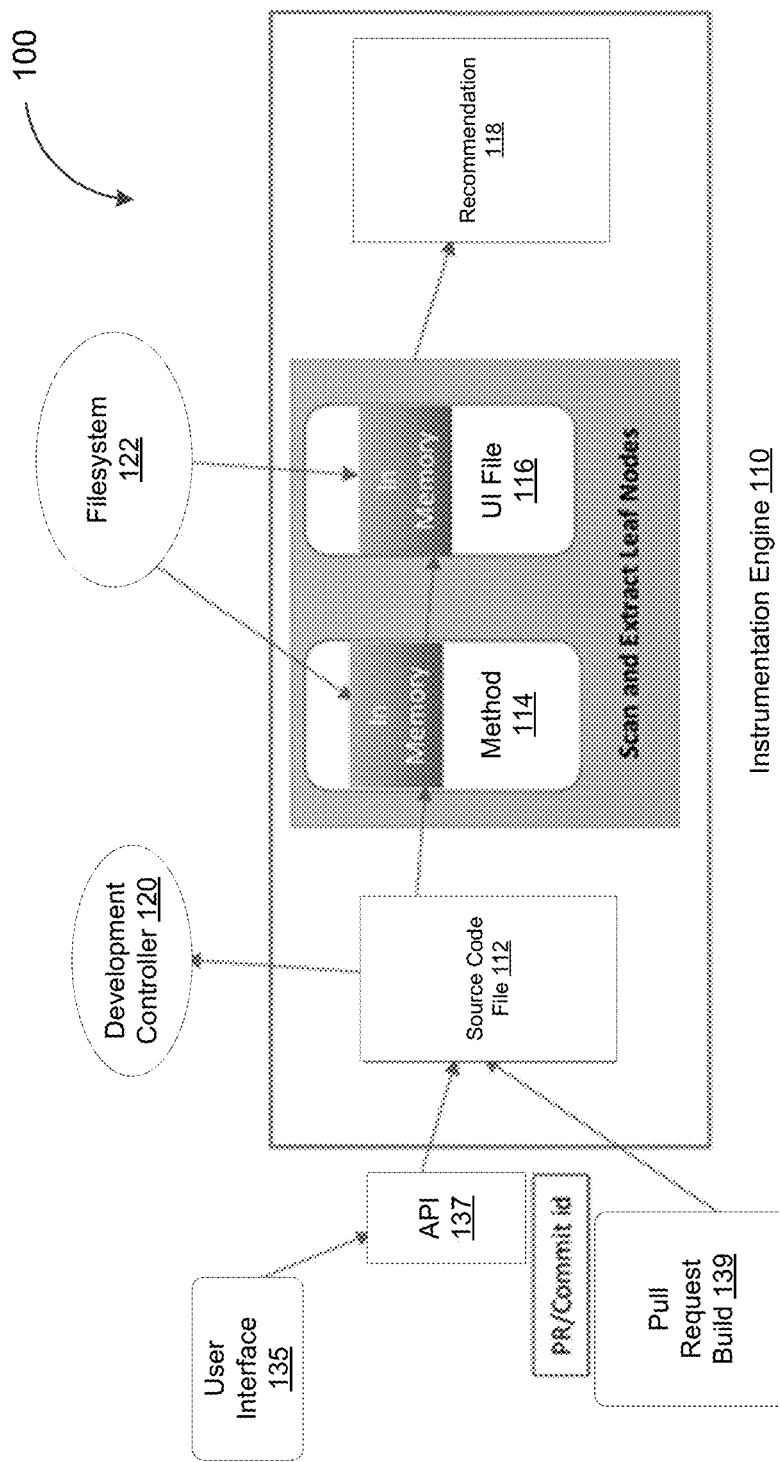
FIG. 1B depicts a block diagram illustrating an architecture of an example of an instrumentation system, in accordance with some example embodiments.

Referring to FIG. 1B, the instrumentation engine 110 may be configured to identify the functional impact of an update to a software application 150 deployed at a production environment 155. The software application 150 may be an enterprise software application including, for example, an enterprise resource planning (ERP) software application, a customer relationship management (CRM) software application, and/or the like. In the example shown in FIGS. 1A-B, a user at the client device 130 may interact with the development controller 120 to generate the update to the software application 150. The development controller 120 may include one or more software development applications and/or programming code repositories, which may be local at the client device 130 and/or cloud-based. In doing so, the user at the client device 130 may modify or generate a source code file 112 associated with the software application 150, which may be stored at the code repository 125 associated with the development controller 120. Moreover, as shown in FIG. 1B, the user at the client device 130 may interact with the instrumentation engine 110 through a user interface 135 at the client device 130 (and the corresponding application programming interface (API) 137 associated with the instrumentation engine 110) or a pull request build 139 created at the development controller 120.

Figure 1C:
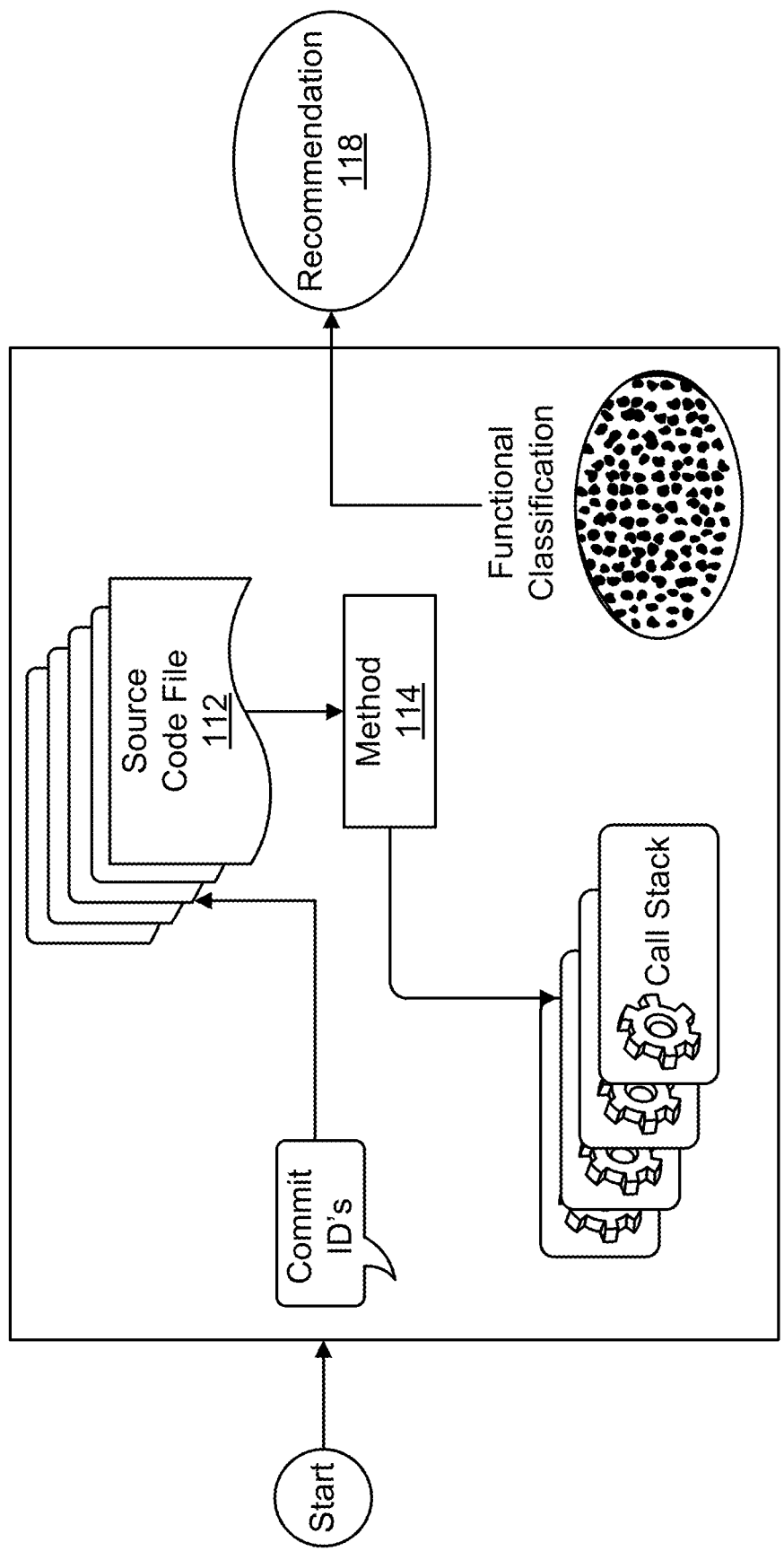
FIG. 1C depicts a block diagram illustrating a data flow in an example of an instrumentation system, in accordance with some example embodiments.

The update may be associated with a commit identifier or a pull request number. As such, the instrumentation engine 110 may identify the source code file 112 associated with the update based on the corresponding commit identifier and/or pull request number. Moreover, the instrumentation engine 110 may be configured to identify one or more functional flows of the software application 150 that may be impacted by the changes indicated by the source code file 112. As shown in FIGS. 1B-C, the instrumentation engine 110 may scan the source code file 112 identify a method 114 impacted by the update to the software application 150. For example, the method 114 may be impacted by the update to the software application 150 at least because the modification and/or addition of the source code file 112 modifies and/or adds the method 114. The instrumentation engine 112 may further identify a user interface file 116 called by the method 114 and one or more functional flows associated with the user interface file 116. As shown in FIGS. 1C-B, the instrumentation engine 112 may generate a recommendation 118 that includes the one or more functional flows associated with the user interface file 116 called by the method 114 impacted by the update to the software application 150. Furthermore, as shown in FIG. 1B, the scanning of the source code file 112 and the identification of the user interface file 116 may be performed in-memory and in a file system 122 having access to the source code file 112 and the user interface file 116.

Figure 2A:
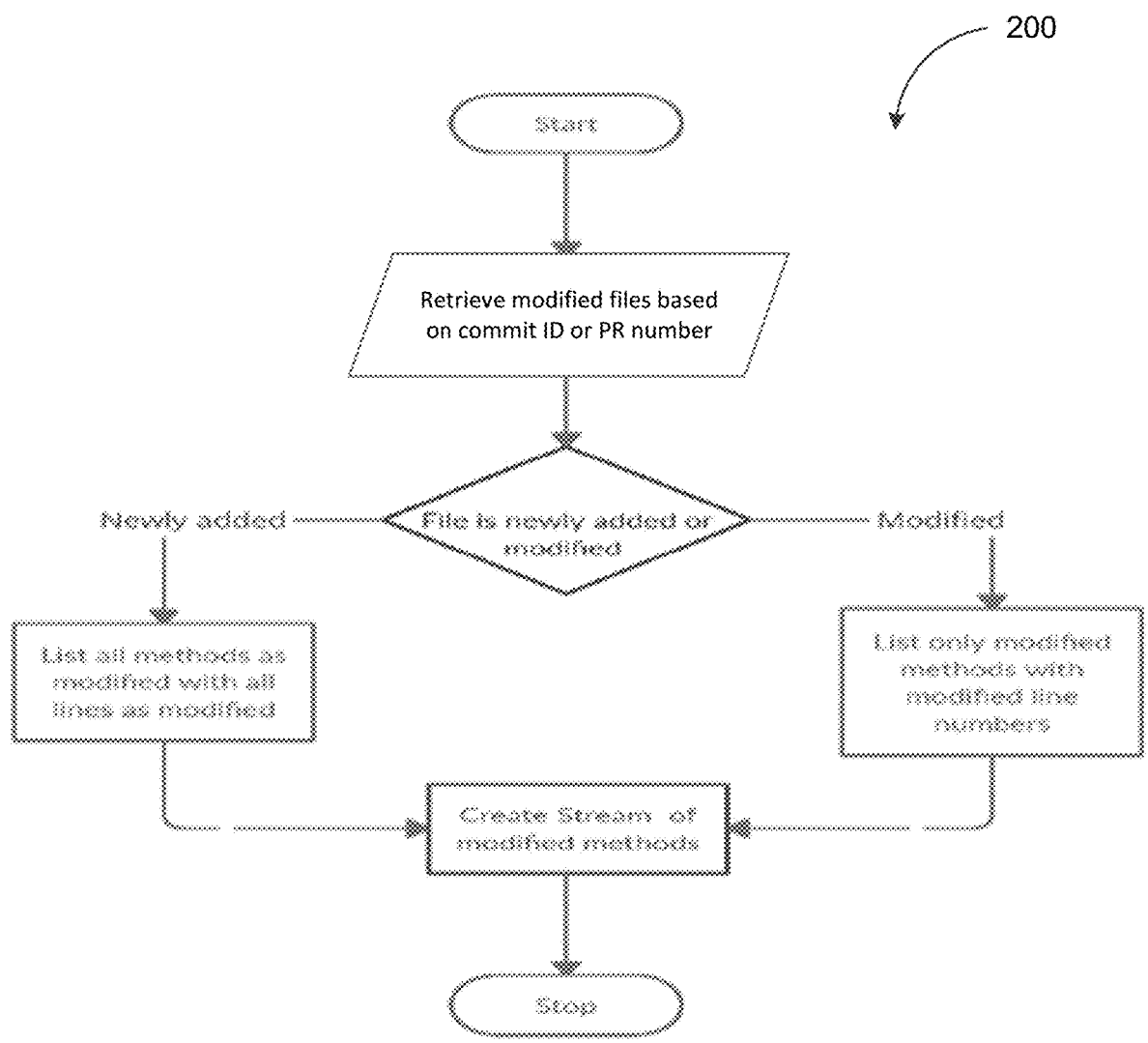
FIG. 2A depicts a flowchart illustrating an example of a process for identifying methods affected by a change to the programming code of a software application, in accordance with some example embodiments.

FIG. 2A depicts a flowchart illustrating an example of a process 200 for identifying methods affected by a change to the programming code of the software application 150, in accordance with some example embodiments. In some example embodiments, the instrumentation engine 110 may retrieve, based at least on a commit identifier and/or a pull request number, one or more source code files from the development controller 120 that have been modified as a part of a corresponding update to the software application 150. As shown in FIG. 2A, the instrumentation engine 110 may determine whether a source code file is newly added or modified. For a newly added source code file, the instrumentation engine 110 may identify each method included in the newly added source code file as a modified method. Alternatively, for a modified source code file, the instrumentation engine 110 may identify the modified methods included in the file. As used herein, the term "method" may refer to a block of programming code (e.g., statements, expressions, and/or the like) that is executed by invoking a name assigned to the block of programming code. Accordingly, as shown in FIG. 2A, a modified method may be identified by the line numbers of the corresponding block of programming code. Moreover, as shown in FIG. 2A, the instrumentation engine 110 may generate a stream of modified methods, which may include the modified methods from newly added source code files and/or modified source code files. The functional impact of the update to the software application 150 may be determined based at least on the methods modified by the addition and/or modification of one or more corresponding source code files.

Figure 2B:
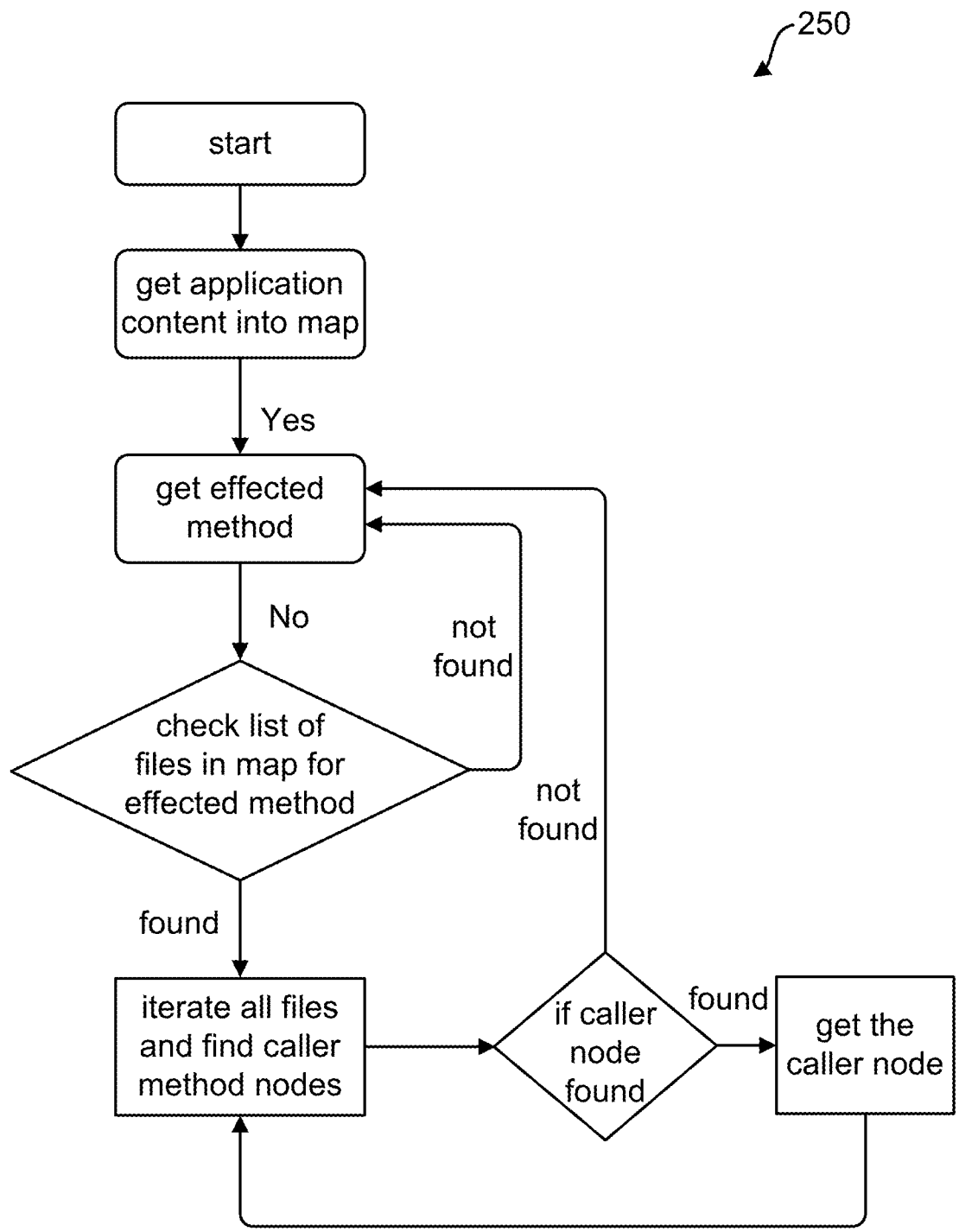
FIG. 2B depicts a flowchart illustrating an example of another process for identifying methods affected by a change to the programming code of a software application, in accordance with some example embodiments.

In addition to the methods modified by addition and/or modification of one or more source code file associated with the software application 150, the functional impact of the update to the software application 150 may extend to other methods called by the modified methods. The interactions between the different methods associated with the software application 150, including methods calling and/or being called by other methods, may form the call stack of the software application 150. FIG. 2B depicts a flowchart illustrating an example of another process 250 for identifying methods affected by a change to the programming code of the software application 150, in accordance with some example embodiments. As shown in FIG. 2B, for each method that is identified as being modified by the addition and/or modification of one or more source code files associated with the software application 150, the instrumentation engine 110 may identify one or more other methods that are called directly or indirectly by the method, for example, by iterating through each method called by the method until the instrumentation engine 110 reaches a method that makes no calls to other methods. For example, for a first method identified as being modified by the addition and/or modification of one or more source code files associated with the software application 150, the instrumentation engine 110 may determine that the first method calls a second method which further calls a third method. The iteration may cease at the third method if the instrumentation engine 110 determines that the third method does not call any other methods. Accordingly, in addition to the first method, the instrumentation engine 110 may identify the second method and the third method as being impacted by the update to the software application 150.

In some example embodiments, to determine the functional impact of the update to the software application 150, the instrumentation engine 110 may identify the user interface files affected by the methods impacted by the update to the software application 150. As noted, the method impacted by the update to the software application 150 may include a first method that is added and/or modified by the addition and/or modification of one or more source code files associated with the software application 150 as well as a second method called directly or indirectly by the first method. Each method that is impacted by the update to the software application 150 may further affect one or more user interface files, which include programming code for implementing the user interface through which one or more functional flows of the software application 150 are invoked. To further illustrate, FIG. 3A depicts a flowchart illustrating an example of a process 300 for identifying user interface files affected by a change to the programming code of the software application 150, in accordance with some example embodiments.

Figure 3A:
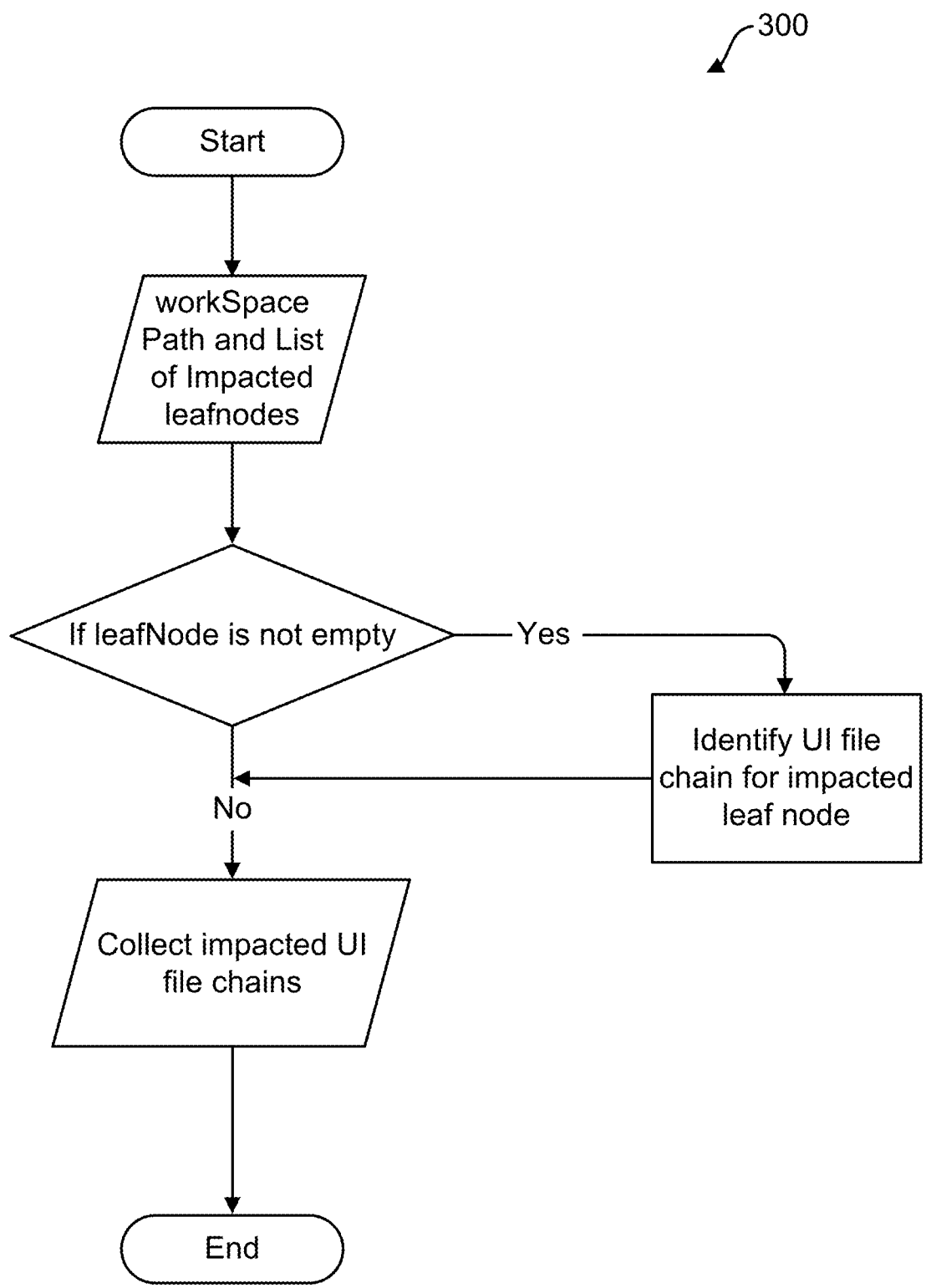
FIG. 3A depicts a flowchart illustrating an example of a process for identifying user interface files affected by a change to the programming code of a software application, in accordance with some example embodiments.

Referring to FIG. 3A, for each method that is affected by the update to the software application 150, the instrumentation engine 110 may identify one or more user interface files containing calls to the method. Moreover, for each user interface file identified as containing a call to a method affected by the update to the software application 150, the instrumentation engine 110 may identify one or more parent user interface files containing calls to that user interface file. The resulting chain of user interface files may correspond to the user interface files that are affected by the update to the software application 150. According to some example embodiments, the functional impact of the update to the software application 150 may be determined by at least identifying the functional flows that are associated with the chain of user interface files affected by the update to the software application 150.

Figure 3B:
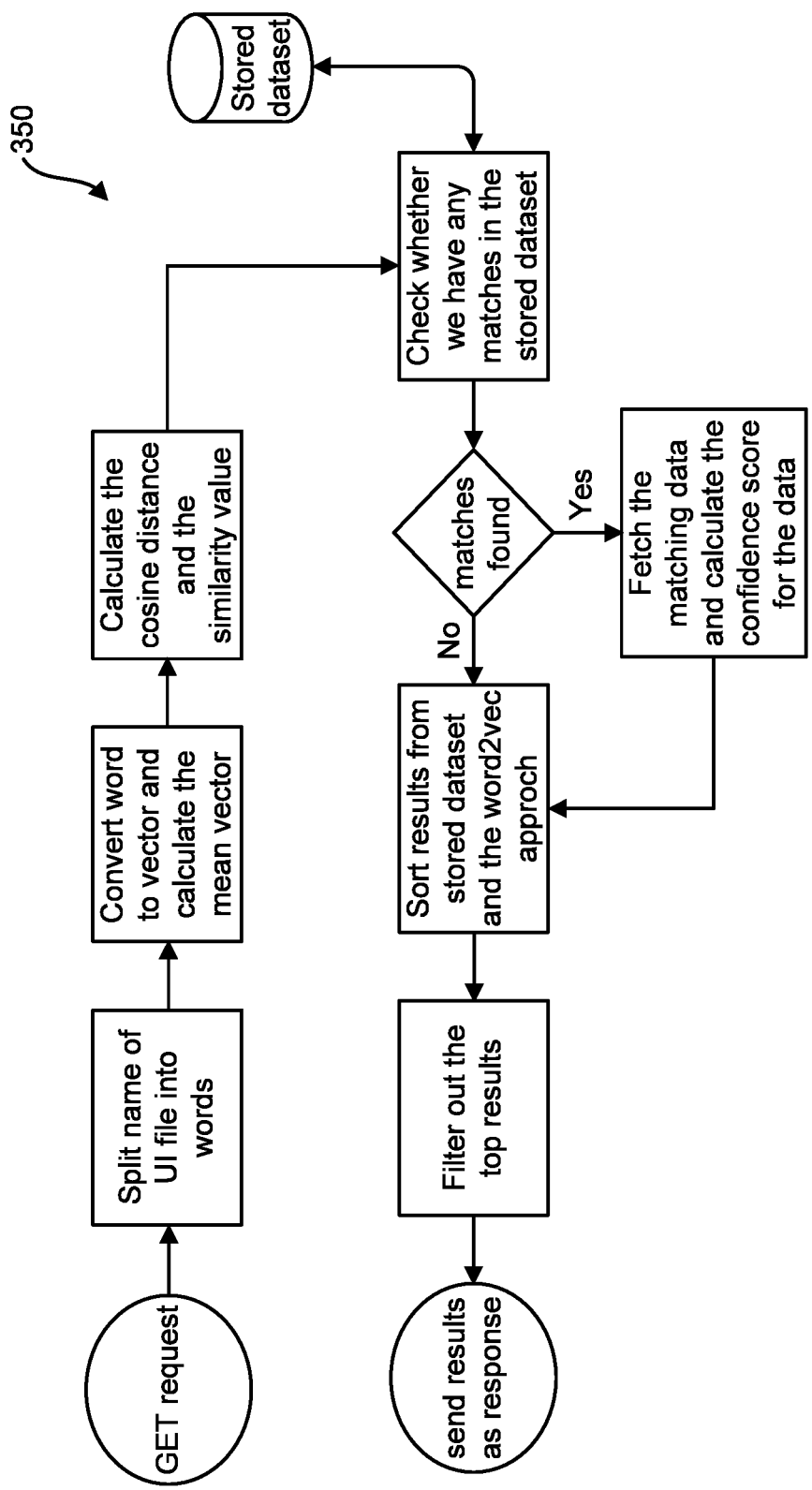
FIG. 3B depicts a flowchart illustrating an example of a process for identifying functional flows affected by a change to the programming code of a software application, in accordance with some example embodiments.

FIG. 3B depicts a flowchart illustrating an example of a process 350 for identifying functional flows affected by a change to the programming code of the software application 150, in accordance with some example embodiments. In some example embodiments, the functional impact of the update to the software application 150 may be determined by identifying one or more functional flows whose names exhibit sufficient nexus to the names of the user interface files affected by the update to the software application 150. Referring to FIG. 3B, the instrumentation engine 110 may retrieve a dictionary containing the names of the existing functional flows associated with the software application 150, for example, by executing a hypertext transfer protocol (HTTP) method such as a GET request at the production environment 155. The words included in the name of a user interface file may be tokenized, for example, into individual words before each word is embedded into a word vector. For example, a word vector representative of a word may be generated by applying an embedding technique such as word2vec, one-hot encoding, and/or the like. The instrumentation engine 110 may determine, based at least on the vector associated with each word included in the name of the user interface file, a mean vector corresponding to a mean (or other summary value) of the vectors representative of the individual words. The instrumentation engine 110 may calculate a similarity metric (e.g., 1-cosine distance) between the mean vector associated with the name of the user interface file with the mean vectors representative of the names of various functional flows.

The instrumentation engine 110 may determine that the user interface file matches a functional flow when the similarity metric between the respective names satisfy a threshold. In some cases, the match between the user interface file and the functional flow may be associated with a confidence score. Thus, when multiple functional flows are identified as matching the user interface file, the instrumentation engine 110 may filter the matching functional flows based on the respective confidence scores. For example, the instrumentation engine 110 may identify a functional flow as being impacted by the update to the software application 150 if the confidence score associated with the match between the names of the functional flow and a user interface file affected by the update satisfy a threshold (e.g., 25% or another value). Alternatively and/or additionally, the instrumentation 110 may identify a certain quantity functional flows with the highest confidence scores as the functional flows impacted by the update to the software application 150.

The instrumentation engine 110 may determine, based on user feedback, the confidence score associated with a match between a user interface file and a functional flow. For example, when the instrumentation engine 110 identifies the functional flow as matching the user interface file based on the similarity metric between their respective names, the instrumentation engine 110 may also receive user feedback indicating whether the functional flow matches user interface file. The confidence score associated with this match may correspond to a first quantity of positive feedback (e.g., the functional flow matches the user interface file) and/or a second quantity of negative feedback (e.g., the functional flow does not match the user interface file). Accordingly, in some example embodiments, the instrumentation engine 110 may determine that the functional flow matches the user interface if the similarity metric between the respective names satisfy a first threshold and the confidence score associated with the match satisfy a second threshold.

In some example embodiments, the instrumentation engine 110 may generate the recommendation 118 based at least on the functional flows identified as matching the user interface files affected by the update to the software application 150. For example, the recommendation 118 may identify the functional flows as candidates for regression testing including, for example, web testing, application programming interface (API) testing, desktop testing, and/or the like. In some cases, the instrumentation engine 110 may update, based on user feedback received, for example, from the client device 130, the matches between functional flows and user interface files. For instance, the user feedback may include one or more indications that verify whether a functional flow matches a user interface file identified as matching the functional flow. In the event the user feedback indicates that the functional flow does not in fact match the user interface file, the instrumentation engine 110 may update the mapping between the functional flow and the user interface file such that the functional flow is not selected upon subsequent encounters with the same user interface file.

Figure 4:
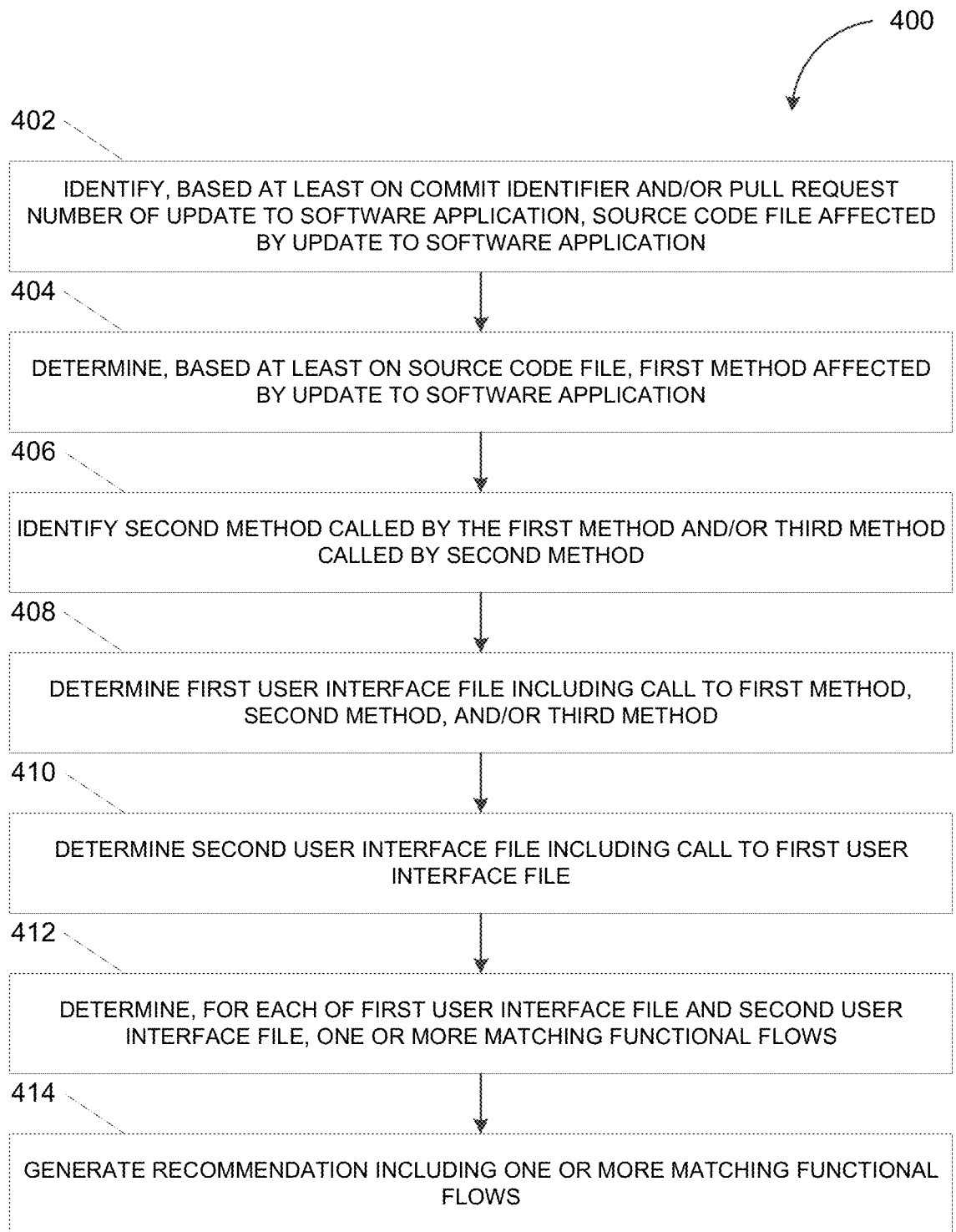
FIG. 4 depicts a flowchart illustrating an example of a process for software instrumentation, in accordance with some example embodiments.
Figure 5A:
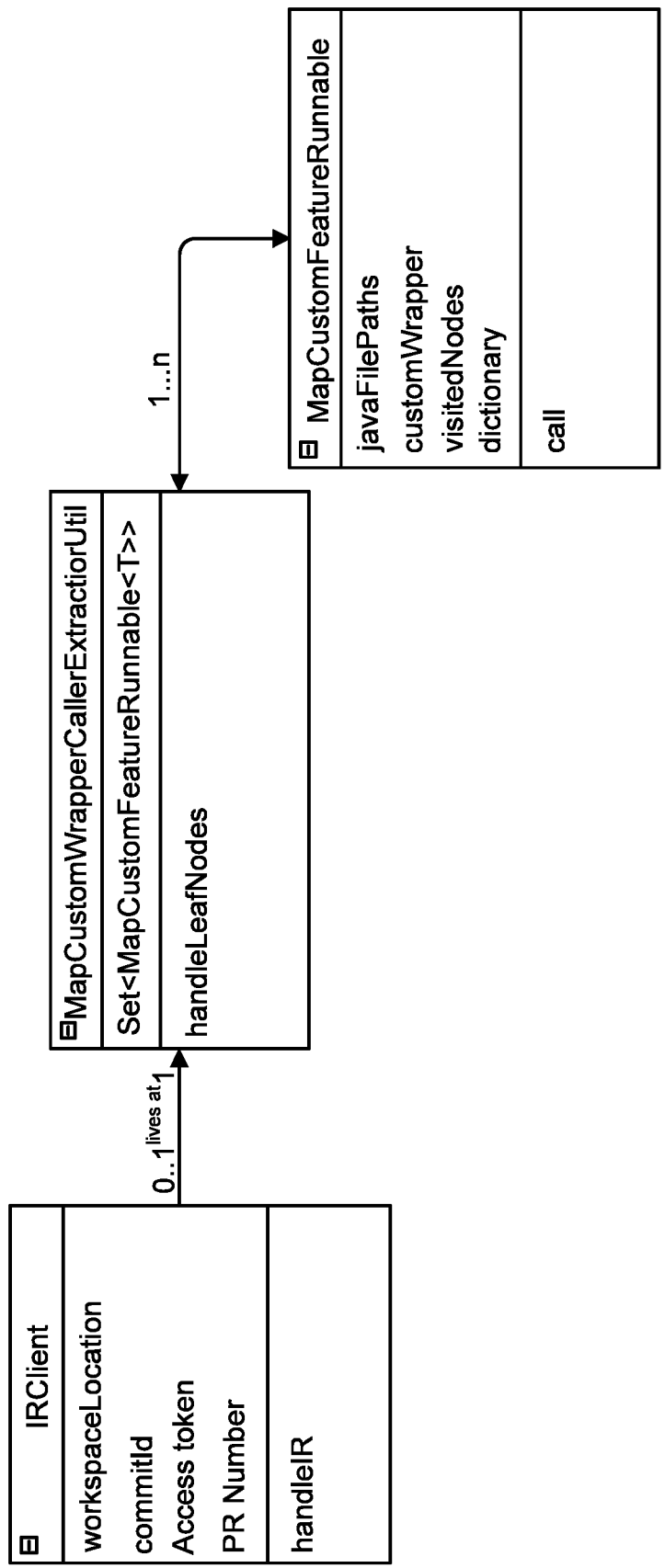
FIG. 5A depicts a class diagram illustrating an example of a class associated with the software instrumentation system, in accordance with some example embodiments.
Figure 5B:
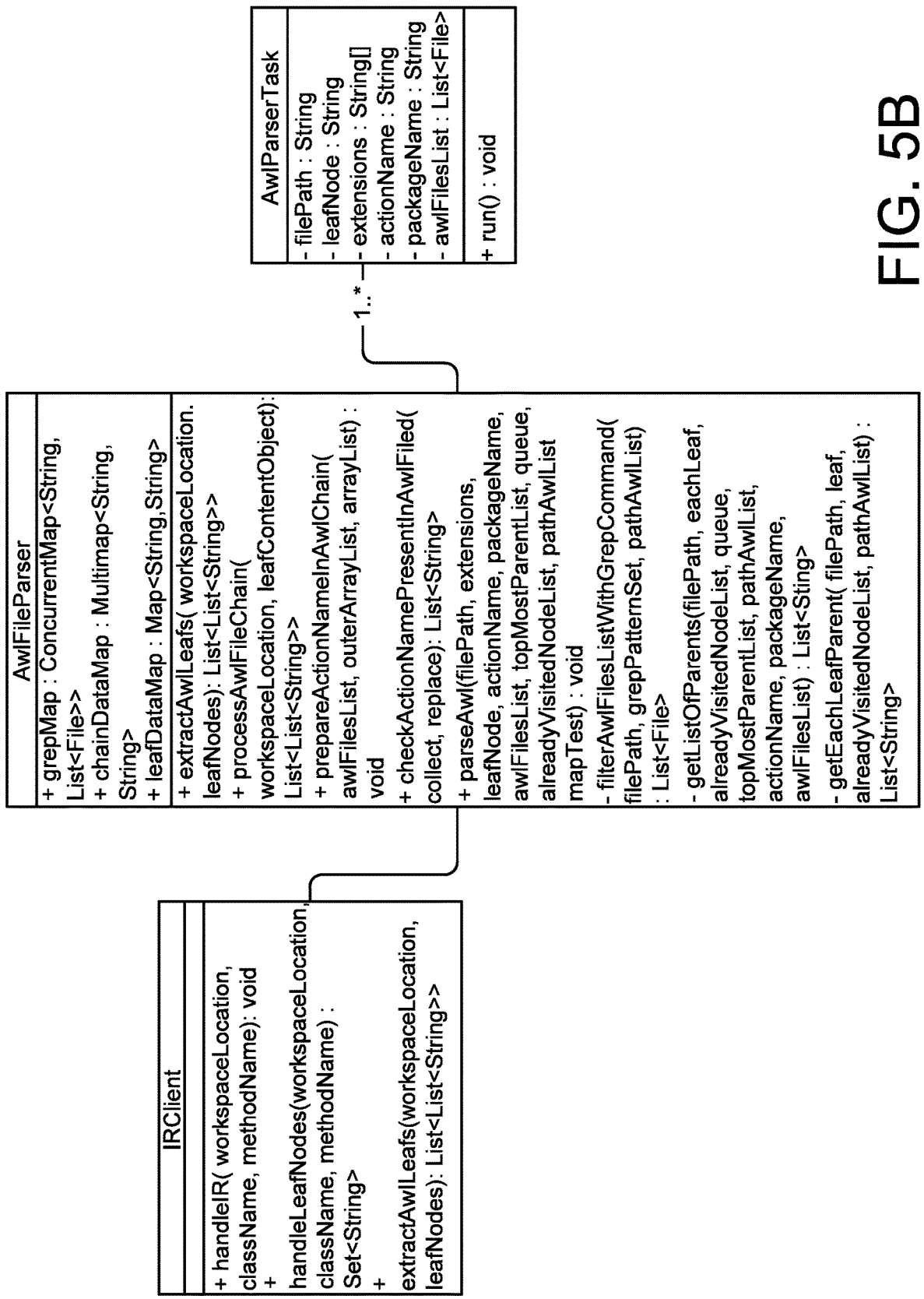
FIG. 5B depicts a class diagram illustrating an example of another class associated with the software instrumentation system, in accordance with some example embodiments.
Figure 5C:
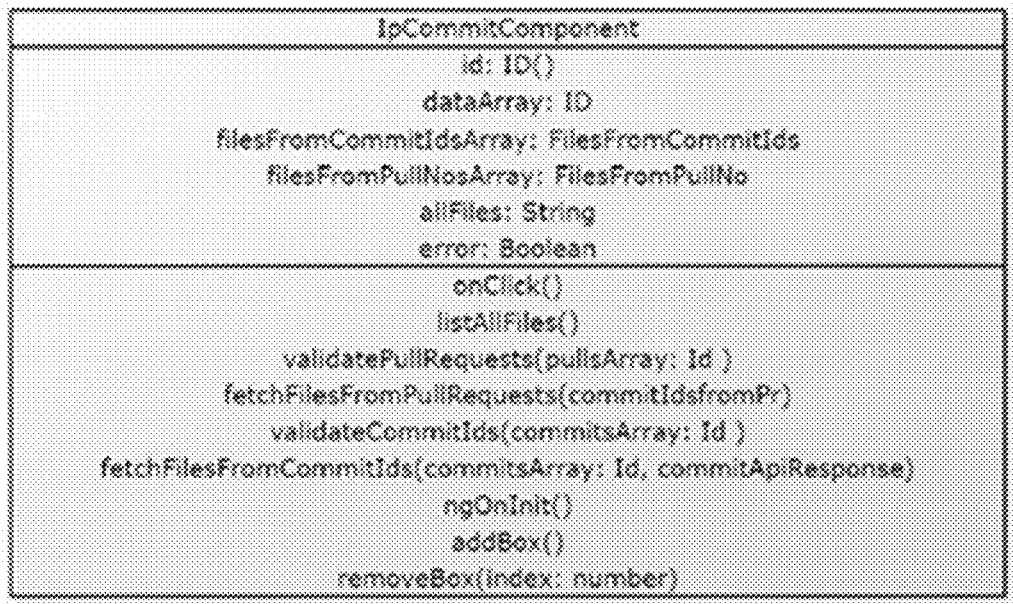
FIG. 5C depicts a class diagram illustrating an example of another class associated with the software instrumentation system, in accordance with some example embodiments.
Figure 5D:
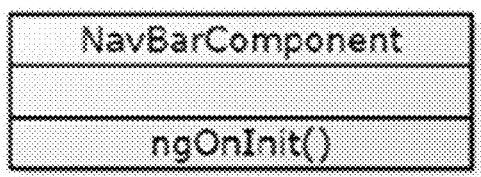
FIG. 5D depicts a class diagram illustrating an example of another class associated with the software instrumentation system, in accordance with some example embodiments.
Figure 5E:
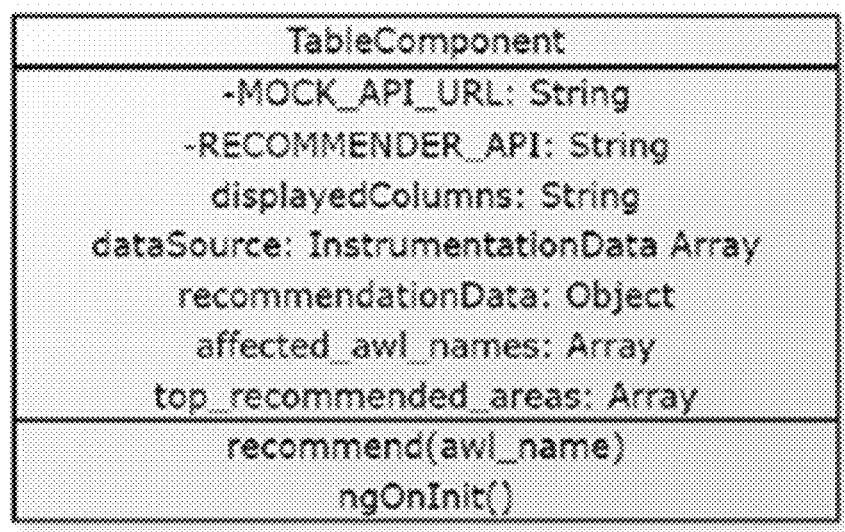
FIG. 5E depicts a class diagram illustrating an example of another class associated with the software instrumentation system, in accordance with some example embodiments.
Figure 5F:
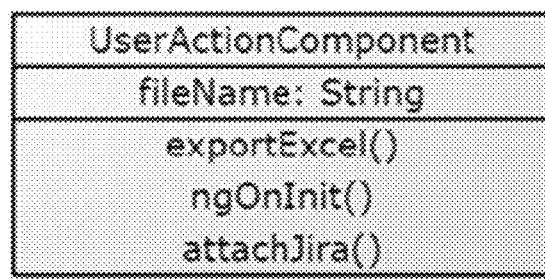
FIG. 5F depicts a class diagram illustrating an example of another class associated with the software instrumentation system, in accordance with some example embodiments.
Figure 5G:
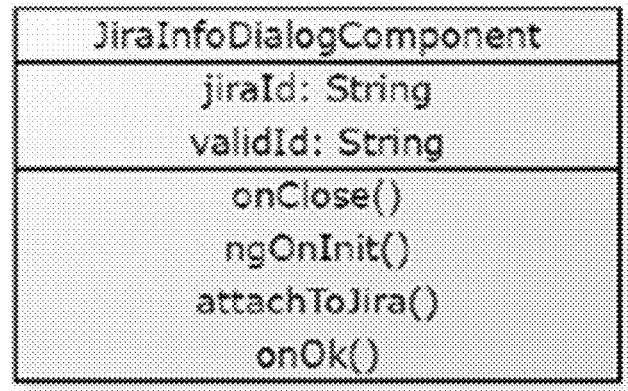
FIG. 5G depicts a class diagram illustrating an example of another class associated with the software instrumentation system, in accordance with some example embodiments.
Figure 5H:
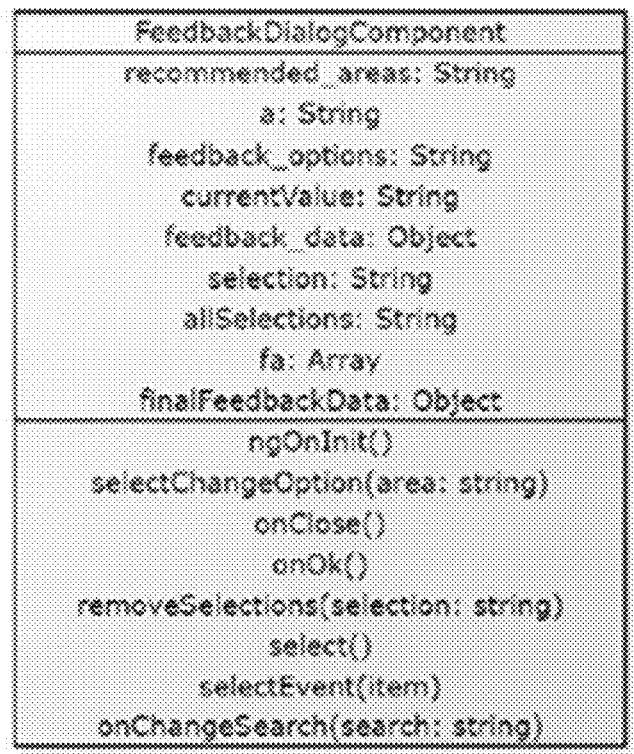
FIG. 5H depicts a class diagram illustrating an example of another class associated with the software instrumentation system, in accordance with some example embodiments.
Figure 5I:
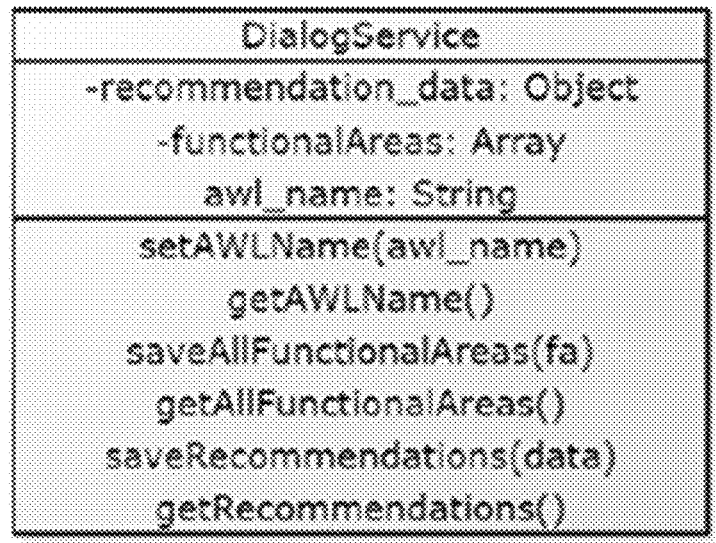
FIG. 5I depicts a class diagram illustrating an example of another class associated with the software instrumentation system, in accordance with some example embodiments.
Figure 5J:
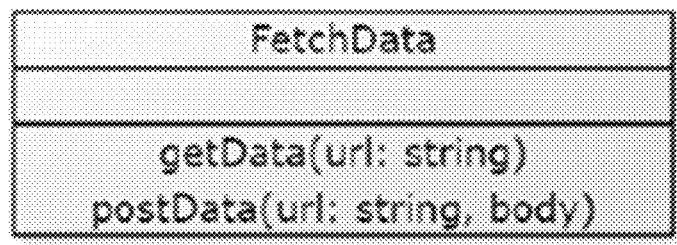
FIG. 5J depicts a class diagram illustrating an example of another class associated with the software instrumentation system, in accordance with some example embodiments.

FIG. 4 depicts a flowchart illustrating an example of a process 400 for software instrumentation, in accordance with some example embodiments. Referring to FIGS. 1A-C and 4, the process 400 may be performed by the instrumentation engine 110 in order to determine the functional impact of an update to the software application 150 deployed, for example, at the production environment 155. The update to the software application 150 may be generated by a user at the client device 130 interacting with the development controller 120. Moreover, the update may include adding and/or modifying the source code file 112 associated with the software application 150. Whether the update to the software application 150 includes the addition of the source code file 112 or a modification thereof, the update to the software application 150 may be associated with a commit identifier or a pull request number. Thus, the source code file 112 associated with the update to the software application 150 may be retrieved, for example, from the code repository 125 associated with the development controller 120, based on the corresponding commit identifier or pull request number.

At 402, the instrumentation engine 110 may identify, based at least on a commit identifier and/or a pull request number of an update to the software application 150, a source code file affected by the update to the software application 150. For example, as shown in FIG. 1A, the update to the software application 150 may be generated by a user at the client device 130 interacting with the development controller 120. The update to the software application 150 may include adding and/or modifying the source code file 112 associated with the software application 150. The update to the software application 150 may be instrumented in order to assess performance, diagnose errors, and write corresponding trace information logging the execution of the software application. For instance, as shown in FIG. 1B, the instrumentation of the update to the software application 150 may be triggered by the user via the user interface 135 at the client device 130. Alternatively, the instrumentation of the update to the software application 150 may be performed as part of the pull request build 139. In some cases, the instrumentation of the update to the software application 150 may include subjecting the software application 150 to regression testing including, for example, web testing, application programming interface (API) testing, desktop testing, and/or the like. The scope of this testing may be determined based on the functional impact of the update.

At 404, the instrumentation engine 110 may determine, based at least on the source code file, a first method affected by the update to the software application 150. For example, as shown in FIG. 2A, the instrumentation engine 110 may determine whether the source code file 112 is added or modified as part of the update to the software application 150. In the event the source code file 112 is added as part of the update to the software application 150, the instrumentation engine 110 may identify each method included in the source code file 112 as being affected by the update to the software application 150. Alternatively, if the software application 150 is updated by modifying the source code file 112, the instrumentation engine 110 may identify the modified methods included in the source code file 112.

At 406, the instrumentation engine 110 may determine a second method called by the first method and/or a third method called by the second method. In some example embodiments, the functional impact of the update to the software application 150 may extend to other methods called by the modified methods associated with the source code file 112. For example, for a first method identified as being modified by the addition and/or modification of the source code file 112 associated with the software application 150, the instrumentation engine 110 may determine that the first method calls a second method which further calls a third method. The iteration may cease at the third method if the instrumentation engine 110 determines that the third method does not call any other methods. Accordingly, in addition to the first method, the instrumentation engine 110 may identify the second method and the third method as being impacted by the update to the software application 150.

At 408, the instrumentation engine 110 may determine a first user interface file including a call to the first method, the second method, and/or the third method. In some example embodiments, to determine the functional impact of the update to the software application 150, the instrumentation engine 110 may identify the user interface files affected by the methods impacted by the update to the software application 150. In the foregoing example, the update to the software application 150 affects the first method as well as the second method called by the first method and the third method called by the second method. Thus, for each of the first method, the second method, and the third method impacted by the update to the software application 150, the instrumentation engine 110 may identify one or more user interface files, which are affected by the update to the software application 150 at least because these user interface files include calls to the methods affected by the update to the software application 150. As noted, each user interface file may include programming code for implementing the user interface through which one or more functional flows of the software application 150 are invoked. Accordingly, the functional impact of the update to the software application 150 may be determined by identifying the user interface files affected by the update to the software application 150.

At 410, the instrumentation engine 110 may determine a second user interface file including a call to the first user interface file. In some example embodiments, for each user interface file identified as containing a call to a method affected by the update to the software application 150, such as a call to the first method, the second method, and/or the third method included in the foregoing example, the instrumentation engine 110 may identify one or more parent user interface files containing calls to that user interface file. The resulting chain of user interface files may correspond to the user interface files that are affected by the update to the software application 150.

At 412, the instrumentation engine 110 may determine, for each of the first user interface file and second user interface file, one or more matching functional flows. In some example embodiments, the functional impact of the update to the software application 150 may be determined by identifying one or more functional flows whose names exhibit sufficient nexus to the names of the user interface files affected by the update to the software application 150. For example, as shown in FIG. 3B, the words included in the name of a user interface file may be tokenized, for example, into individual words before each word is embedded into a vector. The instrumentation engine 110 may determine, based at least on the vector associated with each word included in the name of the user interface file, a mean vector corresponding to a mean (or other summary value) of the vectors representative of the individual words. Moreover, the instrumentation engine 110 may calculate a similarity metric (e.g., 1-cosine distance) between the mean vector associated with the name of the user interface file with the mean vectors representative of the names of various functional flows. A user interface file may be determined to match a functional flow when the similarity metric between the respective names satisfy a threshold.

At 414, the instrumentation engine 110 may generate a recommendation including the one or more matching functional flows. In some example embodiments, the instrumentation engine 110 may generate the recommendation 118 based at least on the functional flows identified as matching the user interface files affected by the update to the software application 150. For example, the recommendation 118 may identify the functional flows as candidates for regression testing including, for example, web testing, application programming interface (API) testing, desktop testing, and/or the like. In some cases, the match between the user interface file and the functional flow may be associated with a confidence score. Thus, when multiple functional flows are identified as matching the user interface file, the matching functional flows may be filtered based on the respective confidence scores such that the functional flows selected for inclusion in the recommendation 118 are associated with an above-threshold confidence score. Alternatively and/or additionally, the instrumentation engine 110 may select, for inclusion in the recommendation 118, a certain quantity of matching functional flows having the highest confidence score.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: determining, based at least on a source code file affected by an update to a software application, a first method affected by the update to the software application; identifying a second method called by the first method affected by the update to the software application; identifying a first user interface file that includes a first call to the first method and/or the second method; determining that a first functional flow of the software application matches the first user interface file; and generating a recommendation identifying the first functional flow for testing.

Example 2: The system of Example 1, wherein the first functional flow is determined to match the first user interface file based at least on a first name of the first functional flow and a second name of the first user interface file.

Example 3: The system of Example 2, wherein the operations further comprise: generating, for each of one or more words included in the second name of the first user interface file, a corresponding word vector; generating a first mean vector corresponding to a mean of one or more vectors representative of the one or more words included in the second name of the first user interface file; calculating a similarity metric between the first mean vector and a second mean vector associated with the first name of the first functional flow; and determining, based at least on the similarity metric satisfying a threshold, that the first functional flow matches the first user interface file.

Example 4: The system of any one of Examples 1 top 3, wherein the recommendation is generated to include the first functional flow based at least on a confidence score of the match between the first functional flow and the first user interface file satisfying a threshold.

Example 5: The system of any one of Examples 1 to 4, wherein the operations further comprise: identifying, based at least on a commit identifier and/or a pull request number of the update to the software application, the source code file affected by the update to the software application.

Example 6: The system of any one of Examples 1 to 5, wherein the operations further comprise: determining that the update to the software application includes modifying the source code file; and in response to the update to the software application modifying the source code file, determining that the first method is affected by the update but not a third method based at least on the modifying of the source code file changing the first method but not the third method.

Example 7: The system of any one of Examples 1 to 6, wherein the operations further comprise: determining that the update to the software application includes adding the source code file; and in response to the update to the software application adding the source code file, determining that the modifying of the source code file modifies the first method and a third method based at least on the source code file including the first method and the third method.

Example 8: The system of any one of Examples 1 to 7, wherein the operations further comprise: identifying a third method called by the second method; identifying a second user interface file as including a second call to the third method; and determining that the first functional flow and/or a second functional flow of the software application match the second user interface file.

Example 9: The system of any one of Examples 1 to 8, wherein the operations further comprise: identifying a second user interface file that includes call to the first user interface file; determining that a second functional flow of the software application matches the second user interface file; and generating the recommendation to further identify the second functional flow for testing.

Example 10: The system of any one of Examples 1 to 9, wherein the operations further comprise: updating, based at least on a user feedback associated with the recommendation, a confidence score associated with the match between the first functional flow and the first user interface file.

Example 11: The system of Example 10, wherein the confidence score corresponds to a first quantity of user feedback indicating that the first functional flow matches the first user interface file and/or a second quantity of user feedback indicating that the first functional flow does not match the first user interface file.

Example 12: The system of any one of Examples 1 to 11, wherein the first method and the second method each comprise a block of programming code of the software application that is executed by invoking a corresponding name.

Example 13: The system of any one of Examples 1 to 12, wherein the first user interface file includes programming code implementing a user interface through which the first functional flow of the software application is invoked.

Example 14: The system of any one of Examples 1 to 13, wherein the first method affected by the update to the software application is determined in response to a user request received via a user interface.

Example 15: The system of any one of Examples 1 to 14, wherein the first method affected by the update to the software application is determined in response to a request to commit the source code file to a programming code repository.

Example 16: The system of any one of Examples 1 to 15, wherein the testing includes a regression testing of the first functional flow.

Example 17: A method, comprising: determining, based at least on a source code file affected by an update to a software application, a first method affected by the update to the software application; identifying a second method called by the first method affected by the update to the software application; identifying a first user interface file that includes a first call to the first method and/or the second method; determining, based at least on a first name of a first functional flow and a second name of the first user interface file, that the first functional flow of the software application matches the first user interface file; and generating a recommendation identifying the first functional flow for testing.

Example 18: The method of Example 17, further comprising: generating, for each of one or more words included in the second name of the first user interface file, a corresponding word vector; generating a first mean vector corresponding to a mean of one or more vectors representative of the one or more words included in the second name of the first user interface file; calculating a similarity metric between the first mean vector and a second mean vector associated with the first name of the first functional flow; and determining, based at least on the similarity metric satisfying a threshold, that the first functional flow matches the first user interface file.

Example 19: The method of any one of Examples 17 to 18, further comprising: identifying a second user interface file that includes call to the first user interface file; determining that a second functional flow of the software application matches the second user interface file; and generating the recommendation to further identify the second functional flow for testing.

Example 20: A non-transitory computer readable medium storing instructions, which when executed by at least one data processor, result in operations comprising: determining, based at least on a source code file affected by an update to a software application, a first method affected by the update to the software application; identifying a second method called by the first method affected by the update to the software application; identifying a user interface file that includes a call to the first method and/or the second method; determining, based at least on a first name of a functional flow and a second name of the user interface file, that the functional flow of the software application matches the user interface file; and generating a recommendation identifying the functional flow for testing.

Figure 6:
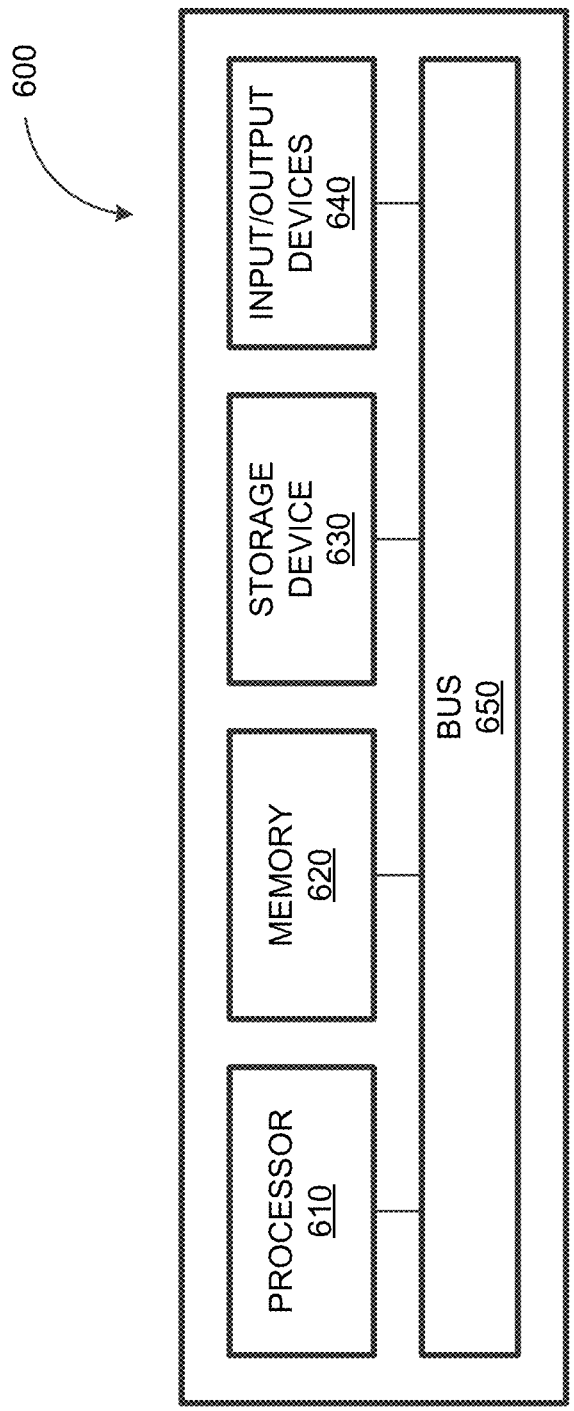
FIG. 6 depicts a block diagram illustrating an example of a computing system, in accordance with some example embodiments.

FIG. 6 depicts a block diagram illustrating a computing system 600 consistent with implementations of the current subject matter. Referring to FIGS. 1A-B and 6, the computing system 600 can be used to implement the instrumentation engine 110 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the instrumentation engine 110 and/or the like. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions, which when executed by the at least one data processor, cause operations comprising:
   determining, based at least on a source code file affected by an update to a software application, a first method affected by the update to the software application;
   identifying a second method called by the first method affected by the update to the software application;
   identifying a first user interface file that includes a first call to the first method or to the second method;
   determining a similarity metric between a first name of a first functional flow of the software application and a second name associated with the first user interface file;
   determining, based at least on the similarity metric satisfying a first threshold, that the first functional flow of the software application matches the first user interface file; and
   subjecting the software application to regression testing in response to determining that the first functional flow of the software application matches the first user interface file, wherein a scope of the regression testing of the software application is limited to the first functional flow.

2. The system of claim 1, wherein the match between the first functional flow and the first user interface file is associated with a first confidence score, and wherein the recommendation is generated to include the first functional flow based at least on the first confidence score of the match between the first functional flow and the first user interface file satisfying a second threshold.

3. The system of claim 2, wherein the operations further comprise:
   generating, for each of one or more words included in the second name of the first user interface file, a corresponding word vector;
   generating a first mean vector corresponding to a mean of one or more vectors representative of the one or more words included in the second name of the first user interface file; and
   determining the similarity metric between the first mean vector and a second mean vector associated with the first name of the first functional flow.

4. The system of claim 1, wherein the operations further comprise:
   identifying a plurality of functional flows as matching the first user interface file;
   filtering the plurality of functional flows based on respective confidence scores; and
   identifying a first quantity of functional flows as impacted by the update to the software application based on the first quantity of functional flows having highest confidence scores of the plurality of functional flows.

5. The system of claim 4, wherein the operations further comprise:
   generating a first mean vector corresponding to a mean of one or more vectors representative of one or more words included in the second name of the first user interface file;
   generating a plurality of mean vectors for the plurality of functional flows corresponding to names of the plurality of functional flows;
   determining a plurality of similarity metrics between the first mean vector and the plurality of mean vectors; and
   determining which functional flows of the plurality of flows match the first user interface file based on whether corresponding similarity metrics satisfy the first threshold.

6. The system of claim 1, wherein the operations further comprise:
   identifying, based at least on a commit identifier of the update to the software application, the source code file affected by the update to the software application;
   determining that the update to the software application includes modifying the source code file; and
   in response to the update to the software application modifying the source code file, determining that the first method is affected by the update but not a third method based at least on the modifying of the source code file changing the first method but not the third method.

7. The system of claim 1, wherein the operations further comprise:
   determining that the update to the software application includes adding the source code file; and
   in response to the update to the software application adding the source code file, determining that modifying of the source code file modifies the first method and a third method based at least on the source code file including the first method and the third method.

8. The system of claim 1, wherein the operations further comprise:
   identifying a third method called by the second method;
   identifying a second user interface file as including a second call to the third method; and
   determining that the first functional flow and a second functional flow of the software application match the second user interface file.

9. The system of claim 1, wherein the operations further comprise:
   identifying a second user interface file that includes a second call to the first user interface file;

determining that a second functional flow of the software application matches the second user interface file; and
generating the recommendation to further identify the second functional flow for testing.

10. The system of claim 1, wherein the operations further comprise:
updating, based at least on a user feedback associated with the recommendation, a confidence score associated with the match between the first functional flow and the first user interface file.

11. The system of claim 10, wherein the confidence score corresponds to a first quantity of user feedback indicating that the first functional flow matches the first user interface file or a second quantity of user feedback indicating that the first functional flow does not match the first user interface file.

12. The system of claim 11, wherein in response to the second quantity of user feedback indicating that the first functional flow does not match the first user interface file, the operations comprise updating a mapping between the first functional flow and the first user interface file such that the first functional flow is not selected upon subsequent encounters with the first user interface file.

13. The system of claim 1, wherein the operations further comprise:
identifying one or more parent user interface files containing calls to the first user interface file, wherein the one or more parent user interface files and the first user interface file correspond to a chain of user interface files; and
determining a functional impact of the update to the software application by at least identifying which functional flows are associated with the chain of user interface files.

14. The system of claim 1, wherein the first method affected by the update to the software application is determined in response to a user request received via a user interface.

15. The system of claim 1, wherein the first method affected by the update to the software application is determined in response to a request to commit the source code file to a programming code repository.

16. The system of claim 1, wherein the regression testing includes an application programming interface testing of the first functional flow.

17. A computer-implemented method, comprising:
determining, based at least on a source code file affected by an update to a software application, a first method affected by the update to the software application;
identifying a second method called by the first method affected by the update to the software application;
identifying a first user interface file that includes a first call to the first method or to the second method;
determining a similarity metric between a first name of a first functional flow of the software application and a second name associated with the first user interface file;
determining, based at least on the similarity metric satisfying a first threshold, that the first functional flow of the software application matches the first user interface file; and
subjecting the software application to regression testing in response to determining that the first functional flow of the software application matches the first user interface file, wherein a scope of the regression testing of the software application is limited to the first functional flow.

18. The method of claim 17, further comprising:
generating, for each of one or more words included in the second name of the first user interface file, a corresponding word vector;
generating a first mean vector corresponding to a mean of one or more vectors representative of the one or more words included in the second name of the first user interface file; and
determining the similarity metric between the first mean vector and a second mean vector associated with the first name of the first functional flow.

19. The method of claim 17, further comprising:
identifying a second user interface file that includes a second call to the first user interface file;
determining that a second functional flow of the software application matches the second user interface file; and
generating the recommendation to further identify the second functional flow for testing.

20. A non-transitory computer readable medium storing instructions, which when executed by at least one data processor, result in operations comprising:
determining, based at least on a source code file affected by an update to a software application, a first method affected by the update to the software application;
identifying a second method called by the first method affected by the update to the software application;
identifying a user interface file that includes a call to the first method or to the second method;
determining a similarity metric between a first name of a functional flow of the software application and a second name associated with the user interface file
determining, based at least on the similarity metric satisfying a first threshold, that the functional flow of the software application matches the user interface file; and
subjecting the software application to regression testing in response to determining that the first functional flow of the software application matches the first user interface file, wherein a scope of the regression testing of the software application is limited to the first functional flow.

* * * * *